Feb. 10, 1970     J. L. SLONNEGER     3,495,101
THERMAL MOTOR
Filed Jan. 8, 1969     4 Sheets-Sheet 2
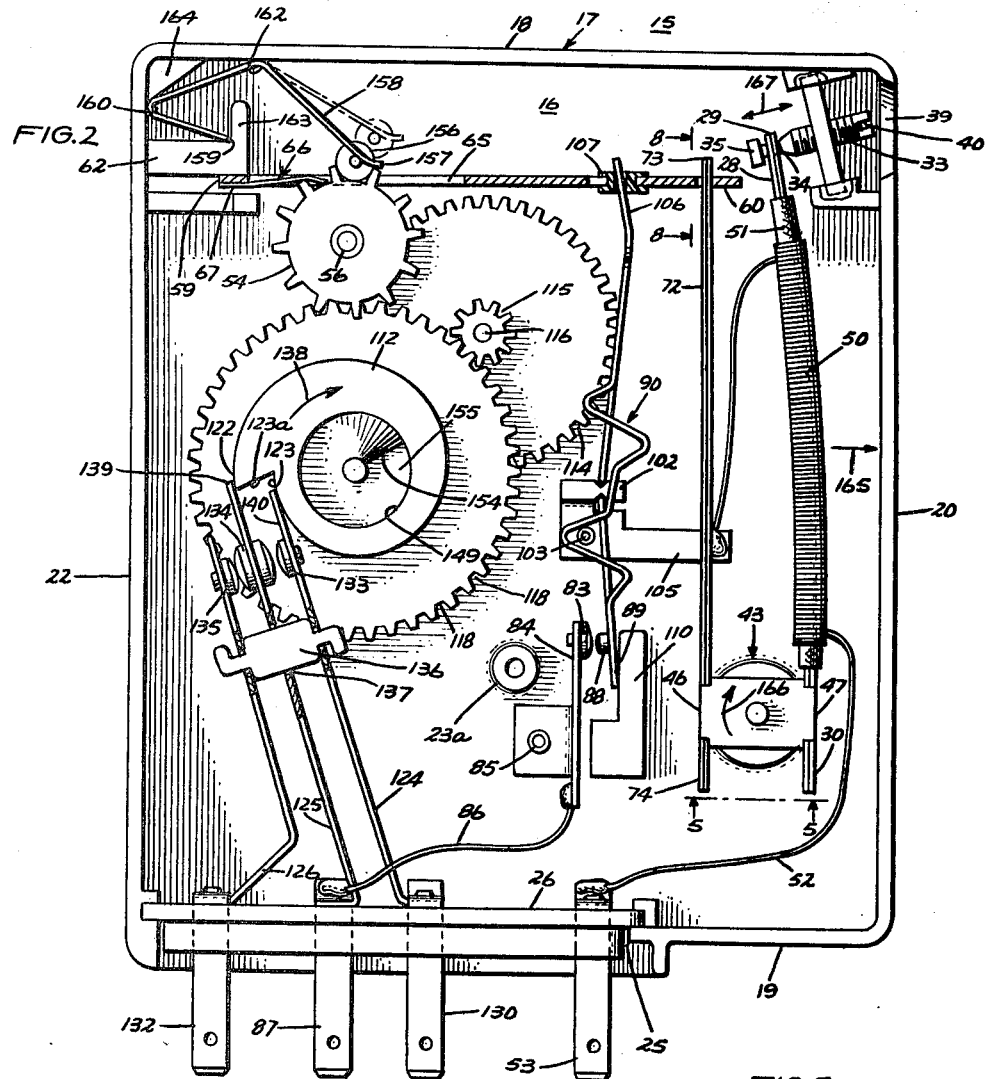
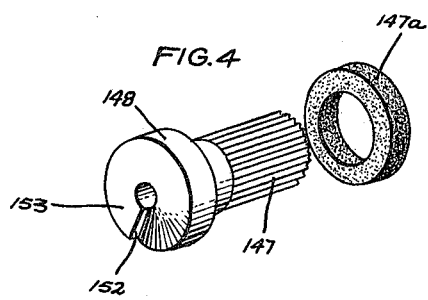
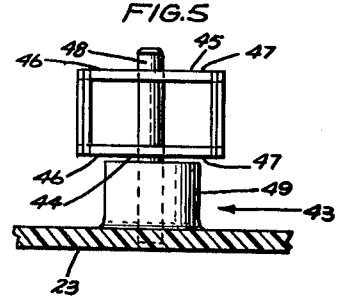
INVENTOR.
John L. Slonneger,
BY *Radford N. Leams*
Attorney.

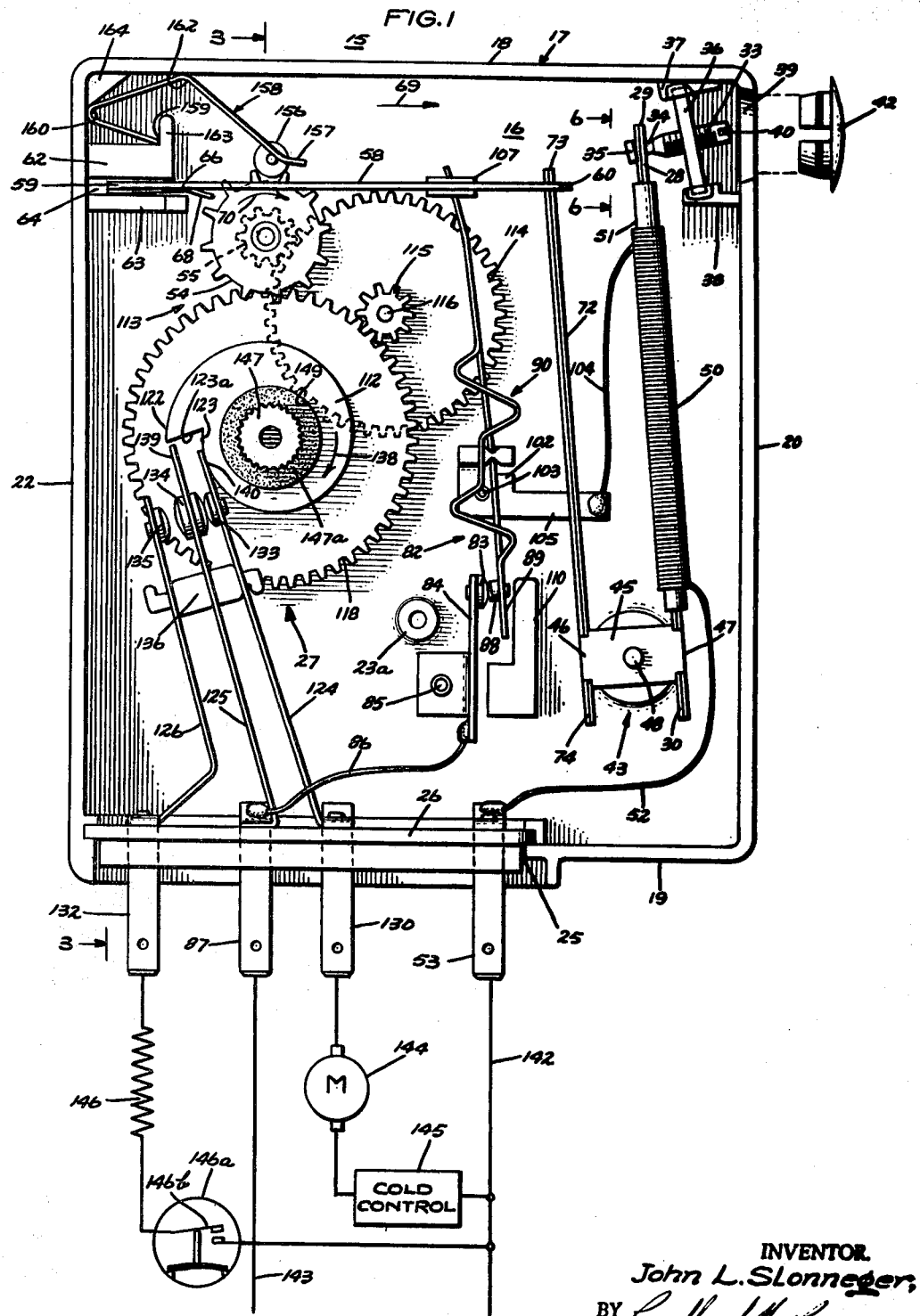

Feb. 10, 1970     J. L. SLONNEGER     3,495,101
THERMAL MOTOR
Filed Jan. 8, 1969     4 Sheets-Sheet 3
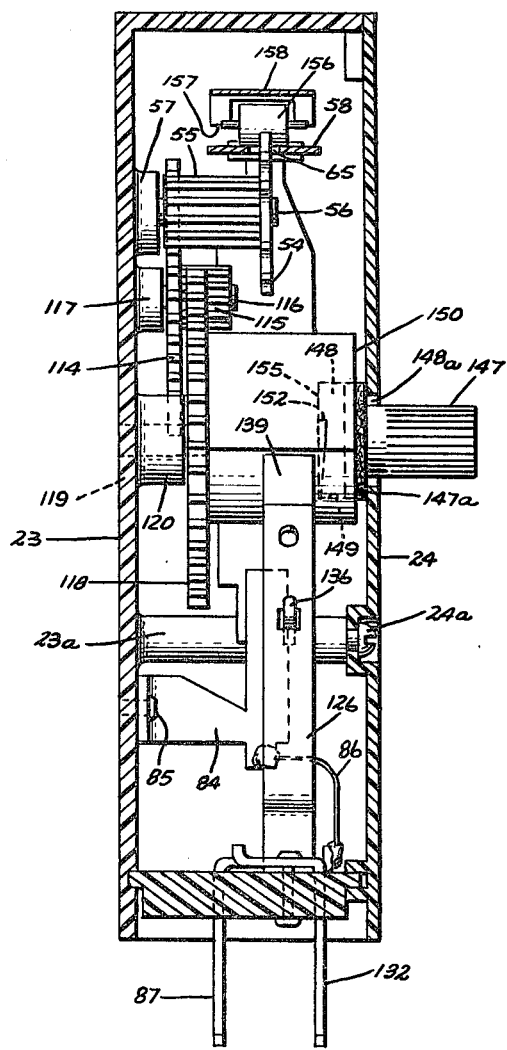
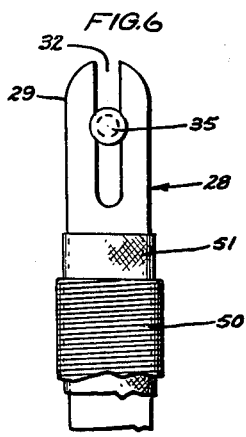
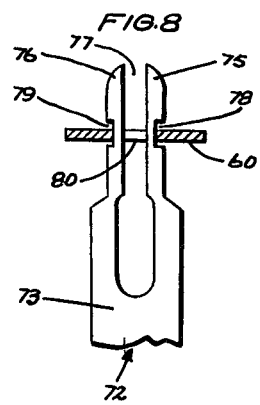
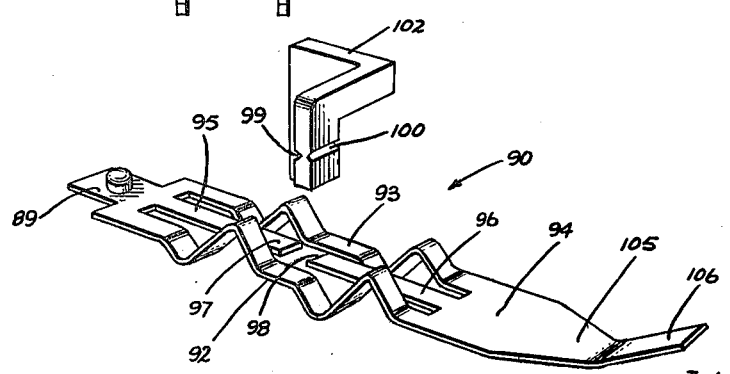
INVENTOR.
John L. Slonneger,
BY
Attorney.

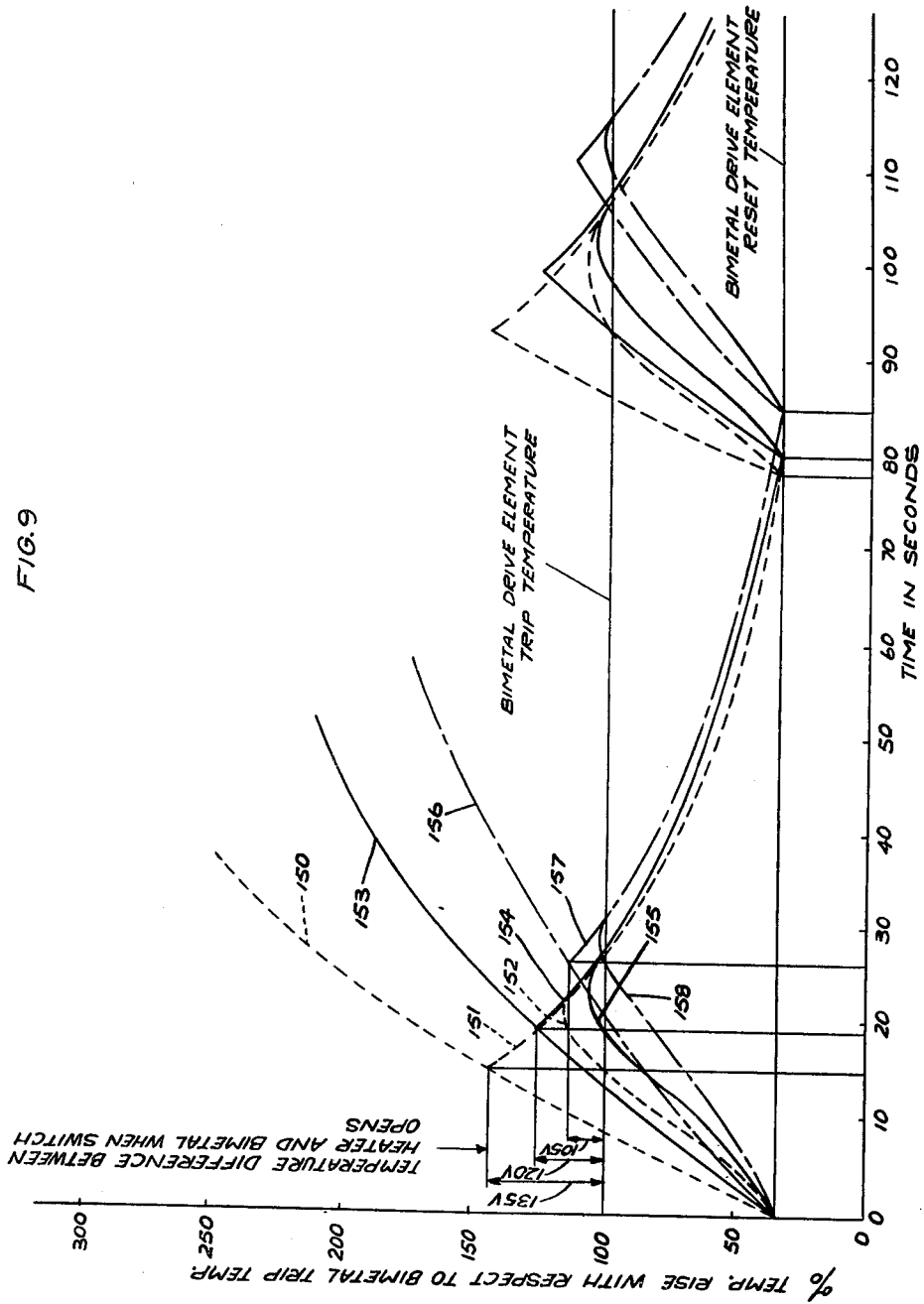

United States Patent Office 3,495,101
Patented Feb. 10, 1970

3,495,101
THERMAL MOTOR
John L. Slonneger, Morrison, Ill., assignor to General Electric Company, a corporation of New York
Filed Jan. 8, 1969, Ser. No. 789,739
Int. Cl. H02n 7/00
U.S. Cl. 310—4    10 Claims

ABSTRACT OF THE DISCLOSURE

A thermal motor includes an elongated bimetallic drive element mounted for pivotal movement at one end and axial movement in the direction of its elongation at the other end so that the drive element will flex in one direction when heated and in the opposite direction when cooled. An elongated compensating bimetal is mounted at one end for pivotal movement with the drive element. A switch is coupled to the heater and connected to the pawl to effect energization and deenergization of the heater after the pawl reaches its first and second positions.

BACKGROUND OF THE INVENTION

This invention relates to thermal motors and, more particularly, to improved thermal motors having higher accuracy.

Thermal motors are well known, commonly incorporating a bimetallic element and accompanying heater and switch. The heater, when energized, heats the bimetallic element causing it to flex in one direction. This opens the switch and deenergizes the heater. The bimetal then cools and flexes in the other direction. This closes the switch and re-energizes the heater. Thus the bimetallic element is flexed in a cyclic manner. The bimetallic element is connected to a timing device such as a ratchet wheel so as to advance it an incremental amount for each cycle of the bimetallic element.

Prior art mechanisms of this type have not been as stable as is often desirable. They have tended to vary in cycling time both as the ambient temperature varies and as the impressed voltage varies.

In many applications a fairly wide variation in cycling time is permissible because the operation being controlled occurs frequently and such variations will have little effect. However, such prior art devices are not sufficiently accurate for many uses such as, for instance, refrigerator defrost controls. Such controls automatically deenergize the refrigeration system and energize a defrost heater for a short time periodically, perhaps once each day, to melt the frost which has formed on the evaporator. Then the control automatically re-energizes the refrigeration system and deenergizes the circuit for the defrost heater.

Normally these controls include a defrost terminator in the form of a bimetal switch connected in circuit with the defrost heater and positioned to sense the evaporator temperature. As long as frost remains on the evaporator, its temperature will be at or below freezing. When the frost is completely melted, the temperature of the evaporator will quickly rise and cause the bimetal terminator switch to open. This deenergizes the defrost heater. The bimetal switch will not reclose until after the automatic defrost control has re-energized the compressor to bring the evaporator temperature below freezing.

Such controls run continuously and there are long time intervals between the defrost cycles. For instance many refrigerator defrost controls are designed to provide one daily defrost action late each night so that it will occur when the refrigerator is not in use.

Variations in the cycling time of the timer could cause a number of unwanted conditions. It could cause the defrost action to last too short a time. Too short an action would cause frost to accumulate on the evaporator and eventually require manual defrosting. Also the time of day of the defrost action well could drift so that it would occur either in the morning or evening, both of which are times of high use of the refrigerator and thus not an optimum time for defrosting.

SUMMARY OF THE INVENTION

Therefore, it is an object of the present invention to provide an improved thermal timer.

It is another object of this invention to provide a thermal timer having greater consistency of cycling time over wide variations in ambient temperature.

It is a further object of this invention to provide a thermal timer having greater consistency of cycling time with variations in the applied voltage.

It is desirable to be able to adjust the cycling time of a thermal timer so as to make cycling time correspond to the desired time period. Therefore, another object of the present invention is to provide a new and improved thermal timer in which the cycling time can be quickly and easily adjusted.

In carrying out the invention in one form thereof there is provided a thermal motor including an elongated bimetallic drive element and an elongated bimetallic ambient compensating element. A pivotally movable means securely engages each of the elements adjacent corresponding ends thereof to mount the elements in generally coaxial juxtaposition in the direction of their elongation. Means restrains movement of the other end of one of the elements in directions transverse to its direction of elongation. A ratchet wheel is included and pawl means is provided for rotating the ratchet wheel a predetermined incremental amount in response to movement of the pawl means from a first to a second position. The other end of the other bimetallic element is drivingly connected to the pawl for moving the pawl between its first and second positions in response to pivotal movement of the corresponding ends of the bimetallic elements. The drive element is proportioned to flex intermediate its ends in one direction in response to heating and in the opposite direction in response to cooling to cause pivotal movement of the corresponding ends of the bimetallic elements. Electrical heating means is disposed in heat transfer relationship with the drive element, and switch means is coupled to the heating means to control the heating and cooling of the drive element. Means is provided for actuating the switch means between its energizing and deenergizing positions in response to predetermined pivotal movement of the corresponding ends of the bimetallic elements.

BRIEF DESCRIPTION OF THE DRAWINGS

The subject matter which I regard as my invention is particularly pointed out and distinctly claimed in the concluding portion of this specification. My invention itself, however, both as to its organization and method of operation, together with further objects and advantages thereof may best be understood by reference to the following description, taken in conjunction with the accompanying drawings, in which:

FIG. 1 is a front view of a refrigerator defrost control with the cover removed, including a thermal motor incorporating one form of the present invention; showing the bimetallic drive element in the cooled position, the cam positioned to close the compressor motor contacts, and illustrating an electrical circuit for use with the control;

FIG. 2 is a front view similar to FIG. 1 but showing the bimetallic drive element in its heated position, the cam positioned to close the defrost heater contacts;

FIG. 3 is a cross-sectional view taken generally along the line 3—3 of FIG. 1, but with the cover in place;

FIG. 4 is a view in perspective showing the manual setting knob used with the defrost control of FIG. 1;

FIG. 5 is a fragmentary view taken generally along the line 5—5 of FIG. 2;

FIG. 6 is a fragmentary view taken generally along the line 6—6 of FIG. 1;

FIG. 7 is a fragmentary exploded view, in perspective, showing certain features of the heater switch used in the defrost control of FIG. 1;

FIG. 8 is a fragmentary view, partly in cross-section, taken along the line 8—8 of FIG. 2; and FIG. 9 is a graphical presentation of operational characteristics of a particular thermal motor, such as that shown in FIG. 1, when different operational voltages are applied.

DESCRIPTION OF THE PREFERRED EMBODIMENTS

Referring now to the drawings, particularly to FIGS. 1 and 3, there is shown a refrigerator defrost control, generally indicated at 15, which incorporates an improved thermal motor in accordance with one embodiment of the invention, generally indicated at 16. An enclosing case 17, preferably molded from suitable plastic insulating material, is provided and has top and bottom walls 18 and 19, side walls 20 and 22, back wall 23, and removable cover 24. Back wall 23 is formed with a threaded boss 23a which receives a screw or bolt 24a to releasably secure the cover 24 to the case 17. Bottom wall 19 has an opening 25 formed therein and a terminal board 26 is positioned in the opening 25. Thermal motor 16, and a defrost cam and switch contact assembly 27 are positioned within the enclosing case 16.

The thermal motor includes an elongated bimetallic drive element 28 having opposite ends 29 and 30. As best seen in FIG. 6, and 29 of bimetallic drive element 28 has a longitudinally extending slot 32 formed therein. A restraining and adjusting screw 33 is provided having a groove 34 formed adjacent its inner end 35 and the groove 34 interfits with the slot 32 in end 29 of the bimetallic element 28. Screw 33 is threadably mounted in a plate 36 retained in slots formed in molded bosses 37 and 38 respectively formed on top wall 18 and side wall 20. An opening 39, formed in side wall 20, provides access to the slotted end 40 of the adjusting screw 33. Opening 39 is closed by a removable, snap-in cap 42. It will be seen that engagement of the slot 32, in end 29 of the bimetallic element 28, with the groove 34, in end 35 of adjusting screw 33, restrains bimetallic element 28 from movement in directions transverse to its direction of elongation, while accommodating longitudinal movement of end 29 of bimetallic elements 28 in the direction of elongation of element 28 in response to flexing of the element due to heating and cooling thereof.

End 30 of bimetallic element 28 is pivotally mounted on back wall 23 by a mounting assembly 43. Referring additional to FIG. 5, pivotal mounting assembly 43 comprises spaced lever members 44 and 45 having opposite ends 46 and 47 and pivotally mounted intermediate their ends by means of a pivot post 48 extending into and secured to a boss 49 formed on back wall 23. The end 47 of each of the lever members 44 and 45 is rigidly secured to bimetallic element 28 adjacent its end 30. A conventional electrically energized resistance heater 50 is positioned about the bimetallic element 28 intermediate its restrained end 29 and pivoted end 30 and is separated therefrom by a sheet 51 of insulative material. Thus the heater 50 is in heat transfer relation to the bimetal drive element 28 and sheet 51 serves to delay heat transfer from heater 50 to drive element 28. Heater 50 has one of its leads 52 connected to plug-in terminal 53 mounted in the terminal board 26.

A toothed ratchet wheel 54, having a pinion 55 attached thereto, is rotatably mounted on a shaft 56, which extends into and is secured to boss 57 formed on back wall 23. A pawl 58 is provided for incrementally rotating ratchet wheel 54. The pawl is formed as an elongated strip of relatively thin sheet metal having opposite ends 59 and 60. End 59 of pawl 58 is supported by guide members 62 and 63 for generally longitudinal sliding movement between a first position, as shown in FIG. 1, and a second position, as shown in FIG. 2. The molded guide members 62 and 63 are formed on and extend outwardly from side wall 22 and back wall 23 and define a slot 64 therebetween which slidably receives end 59 of pawl 58. Pawl 58 extends generally tangentially of the ratchet wheel 54 and has a slot 65 formed therein into which the teeth of the ratchet wheel extend. A leaf spring dog 66 is secured at one end 67 to end 59 of pawl 58 and extends into the slot 65 with its other or distal end 68 adapted to drivingly engage a tooth of the ratchet wheel 54 in response to movement of the pawl 58 in the direction shown by the arrow 69 from its first position to its second position. The dog thus rotates ratchet wheel 54 an incremental amount in the direction shown by the arrow 70 each time the pawl moves from its first to its second position.

Pawl 58 is moved between its first position and its second position by an elongated ambient compensating bimetal element 72 having opposite ends 73 and 74. As seen in FIG. 5, the end 46 of each of the lever members 44 and 45 is rigidly connected to compensating bimetal 72 adjacent its end 74. As best seen in FIG. 1, compensating bimetal 72 extends in spaced, generally parallel relationship with bimetallic drive element 28 when both the bimetals are at the same temperature and screw 33 is in a neutral position not bending bimetal drive member 28. In other words the lever members 44 and 45 pivotally mount the bimetallic drive element 28 and the compensating bimetal element 72 in generally coaxial juxtaposition in the direction of their elongation.

Referring additionally to FIG. 8, end 73 of compensating bimetal 72 has a pair of legs 75 and 76 defining a slot 77 therebetween. Legs 75, 76 have notches 78, 79, respectively, formed therein and legs 75, 76 extend through an opening 80 in end 60 of pawl 58 with notches 78, 79 resiliently engaging the side edges of openings 80.

A heater switch assembly 82 is provided and comprises a stationary contact 83 secured to a terminal 84 mounted on back wall 23, by some suitable means such as rivet 85. Terminal 84 is connected by lead 86 to a plug-in terminal 87 mounted in terminal board 26. Movable contact 88 of switch assembly 82 is carried by end 89 of an over-center switch blade assembly 90 (as best seen in FIG. 7). Switch blade assembly 90 comprises spaced, parallel side elements 92 and 93, respectively, joining its opposite ends 89 and 94; side elements 92, 93 having undulations formed therein, as shown. Center elements 95, 96 extend inwardly from ends 89, 94, and have their inner ends 97, 98 spaced apart, as shown. Ends 97, 98 of the elements 95, 96 are respectively seated in grooves 99, 100 of a support and terminal member 102 which is mounted on the back wall 23, by some suitable means such as rivet 103. The other end of resistance heater 50 is connected by a lead 104 to extension portion 105 of support and terminal member 102. Opposite the arms 92, 93 and 96 the end 94 is formed into a section 105, having a constantly decreasing width in the axially outward direction. The section 105 terminates in a tab 106 which is received in a grommet 107 positioned in an opening in pawl 58 intermediate end 60 and slot 65. Tab 106 may be bent relative to section 105 to adjust the positioning of switch blade assembly 90 relative to pawl 58. The grommet 107 acts as a mechanical energy absorber and an electrical insulator between the switch assembly and the pawl.

It will be seen that the switch blade assembly 90 is actuated in an over-center snap acting fashion in response to movement of pawl 58 between its first position, as shown in FIG. 1, and its second position, as shown in FIG. 2; contacts 83, 88 being closed in the position shown in FIG. 1 and open in the position shown in FIG. 2. A stop 110 in the form of a molded boss formed on back wall 23 is disposed to engage end 89 of switch blade assembly 90 and limit the movement of movable contact 88 in the open position of the contacts. It will be readily understood that contacts 83 and 88 will remain closed until pawl 58 has been moved substantially to its second position, as shown in FIG. 2, and likewise that the contacts will remain open until pawl 58 has returned substantially to its first position as shown in FIG. 1; then the assembly 90 will snap over-center to move the contacts to their other position.

Ratchet wheel 54 drives a contact-actuating cam 112 through a gear train generally indicated at 113. Gear train 113 comprises pinion 55, which is formed on ratchet wheel 54 to mesh with the drive gear 114. Gear 114 has a pinion 115 connected thereto and is rotatably mounted on a shaft 116, shaft 116 extends into and is secured to a boss 117 formed on back wall 23 (as best seen in FIG. 3). Pinion 115 meshes with and drives a gear 118, having cam 112 connected thereto. Cam 112 and gear 118 are rotatably mounted on shaft 119, which extends into and is connected to a boss 120 formed on back wall 23. Cam 112 has a high portion 122 which, in the counterclockwise direction as seen in FIG. 1, gradually merges with a low portion 123. Also portions 122 and 123 are joined by a wall 123a which extends generally radially of the axis of shaft 119 but is slightly undercut.

Three elongated switch blade elements 124, 125 and 126 are provided and have their ends 127, 128 and 129, respectively, secured to plug-in terminals 130, 87 and 132, mounted on terminal board 26. Contacts 133, 134 and 135 are mounted on the free ends of switch blade elements 124, 125 and 126 respectively. As shown in FIG. 2, switch blade elements 124 and 126 are connected together and spaced apart a fixed distance by an insulating spacer 136 which extends through a slot 137 in the middle switch blade element 125. As shown in FIG. 1, switch blade element 125 is biased so that in all positions of the cam 112, other than that shown in FIG. 2, contacts 133 and 134 are closed, while contacts 134 and 135 are open. However, as cam 112 is rotated in the direction shown by the arrow 138 to the position shown in FIG. 2, it will be seen that during a few degrees of rotation of cam 112, end 139 of the middle switch blade element 125 will be engaged by the high portion 122 of cam 112 whereas end 140 of switch blade element 124 has moved into engagement with the low portion 123, this results in opening contacts 133 and 134 and closing contacts 134 and 135. The slightly undercut configuration of wall 123a assures that the blade ends 139 and 140 will fall off of cam high portion 122 cleanly to give a snap action in closing and opening the pair of contacts 133–134 and 134–135.

Plug-in terminal 53 is adapted to be connected through line 142 to one side of a suitable source (not shown) of electrical energy, and plug-in terminal 87 is adapted to be connected through line 143 to the other side. Plug-in terminal 130 is adapted to be connected to one side of a compressor motor, shown schematically at 144, the other side of the motor being connected to line 142 through a conventional cold control, shown schematically at 145. Plug-in terminal 132 is adapted to be connected to line 142 through a defrosting heater, shown schematically at 146 and a defrost terminator 146a. The terminator has a bimetal operated switch 146b which is closed when the evaporator temperature is at or below freezing and is open when the evaporator temperature is substantially above freezing.

A manual resetting knob 147 is provided extending outwardly through opening 148a in cover 24. Knob 147 has an enlarged end 148 received in opening 149 in the top surface 150 of cam 112. A one-way driving connection between manual setting knob 147 and cam 112 is provided by means of a shoulder 152 formed on the bottom surface 153 of enlarged portion 148 which cooperates with a corresponding shoulder 154 formed in the bottom wall 155 of opening 149, as best seen in FIGS. 2 and 4. Thus, manual setting knob 147 may be employed to rotate cam 112 manually in the direction shown by the arrow 138 by means of driving engagement of shoulders 152 and 154, however, no driving connection is provided in the opposite direction and thus inadvertent rotation of manual setting knob 147 in the direction opposite that shown by the arrow 138 will not result in rotation of the cam 112. A ring shaped, combination dust seal and biasing spring member 147a is mounted around knob 147, between its enlarged end 148 and the underside of cover 24. Member 147a conveniently can be formed from a foamed plastic material with a material thickness greater than the distance between the enlarged end 148 and cover 24. Therefore, since the member 147a will be compressed when the cover is in place, it will bias knob 147 into opening 149 and it will close off opening 148 to prevent entry of contaminants through opening 148.

A detent roller 156 is rotatably mounted adjacent end 157 of leaf spring element 158. Leaf spring element 158 is supported by engagement of its end 158 and bends 160 and 162 with a projection 163 on member 62, a boss 164, and top wall 18, as shown in FIGS. 1 and 2. Leaf spring element 158 resiliently biases detent roller 156 into engagement with the toothed edge of ratchet wheel 54.

Assuming now that the components of the defrost control 15 are as shown in FIG. 1, it will be seen that with contacts 133 and 134 closed, compressor motor 144 is connected across the lines 142 and 143 by cold control 145 and will be cycled in normal fashion by the cold control. Likewise bimetal heater 50 is connected for energization across lines 142 and 143 by lead 52, lead 104, the closed contacts 83–88 of switch 82, and lead 86. Energization of heater 50 results in heating of the bimetallic drive element 28, causing it to bow or flex in a direction transverse to its direction of elongation, as shown by the arrow 165 in FIG. 2. This causes pivotal motion of its end 30 and of the mounting assembly 43, as shown by the arrow 166. Mounting assembly 43 pivots compensating bimetal 72 in the same direction, to move pawl 58 from its first position toward its second position, that is, in the direction shown by the arrow 69. In turn, this causes end 68 of leaf spring dog 66 to engage a tooth of ratchet wheel 54 and rotate the ratchet wheel in the direction shown by the arrow 70. This rotation of the ratchet wheel 54 acts through the speed reducing gear train 113 to cause a corresponding, reduced incremental rotation of cam 112 in the direction shown by the arrow 138.

When end 73 of operating member 72 has moved pawl 58 longitudinally in the direction of arrow 69 a predetermined amount in response to thermal flexing of bimetallic element 28, switch blade assembly 90 of switch 82 will snap overcenter to its other position, as shown in FIG. 2, thereby opening contacts 83 and 88 to deenergize heater 50. As bimetallic element 28 cools, it will flex in the other direction, that is, in the direction opposite that shown by the arrow 165; to its normal cooled position, as shown in FIG. 1. This causes its end 30, the mounting assembly 43, and end 74 of compensating bimetal 72 to pivot in the direction opposite that shown by the arrow 166 so that end 73 of compensating bimetal 72 returns pawl 58 towards its first position; that is, in the direction opposite that shown by the arrow 69. When pawl 58 has been substantially returned to its position as shown in FIG. 1, switch blade assembly 90 again will snap over-center to its position as shown in FIG. 1, thereby closing contacts 83 and 88 to reenergize heater 50 and initiate another cycle of operation.

It will now be seen that a predetermined number of cycles of operation of the thermal motor 16 will result in rotational advance of the cam 112 from the position shown in FIG. 1 to its position shown in FIG. 2 in which contacts 133 and 134 are opened, thereby to deenergize the circuit for compressor motor 144, and contacts 134 and 135 are closed, thereby to energize the circuit for defrost heater 146. The compressor motor 144 is deenergized and the defrost heater 146 is energized to melt the frost which has accumulated on the evaporator. As soon as the frost has melted the evaporator temperature rises and the terminator switch 146b opens. This deenergizes the defrost heater 146. After another, relatively small, predetermined number of cycles of operation of the thermal motor 16, cam 122 will be rotationally advanced further in direction 138 to the position shown in FIG. 1, in which contacts 133 and 134 are closed to energize circuit compressor motor 144, and contacts 134 and 135 are opened to deenergize the circuit for defrost heater 146 so that it will not be energized when the terminator switch closes.

It will be readily seen that adjustment of the adjusting screw 33 will result in movement of end 29 of the bimetallic element 28 in the directions shown in by the arrow 167 thereby selectively to adjust the cycling time of the thermal motor 16. It will be understood that heater 50, when energized will cause the temperature of bimetal drive element 28 to rise at a faster rate than the temperature of the drive element will fall when heater 50 is deenergized. Therefore, if screw 33 is turned into the case to increase the heat rise before pawl 58 actuates switch 82, the heating time will be increased a relatively small amount while the cooling time will be decreased a relatively large amount, and the net result will be a shorter cycle time. Conversely, if screw 33 is turned outwardly of the case, the net result will be a longer cycle time.

The insulator 51, which separates the bimetallic drive element 28 and the heater 50 delays heat transfer from heater 50 to element 28. This means that heater 50 will rise in temperature faster than the element 28 and will be at a higher temperature than element 28 when contacts 83 and 88 are opened to deenergize the heater. Therefore the heater will cause the bimetal drive element to be heated slightly beyond the cutoff temperature before it begins to cool. The amount of bimetal temperature overshoot beyond the cutoff temperature for a given thermal motor depends on the wattage input to the heater and the thermal delay of the insulator.

On the other hand, the cooling time for the drive element 28 and heater 50 are sufficiently long that they are at substantially the same temperature by the time they have fallen to the temperature level to cause contacts 83 and 88 to be reclosed. This means that there is no thermal overshoot at this point.

Use can be made of these characteristics to provide greater uniformity of cycle time despite variations in applied voltage. FIG. 9 illustrates the operational characteristics of one thermal motor such as that described above. In obtaining the information for this graph a 1750 ohms heater was used, the insulator was a sheet of polytetrafluoroethylene approximately 10 mils thick and the motor was operated at a 75° F. ambient temperature. The graph plots percent of temperature rise with respect to the bimetal drive element trip temperature against time in seconds. Line 150 shows the heating characteristic of heater 50 with 135 volts applied to the heater while line 151 shows the corresponding cooling characteristic. Line 152 illustrates the corresponding temperature characteristics for the bimetal drive element 28. Lines 153, 154 and 155 illustrate these characteristics for the heater and drive element, respectively, with 120 volts applied. Lines 156, 157 and 158 illustrate these characteristics for the heater and drive element, respectively, with 105 volts applied.

With 135 volts applied, the heater rises in temperature very rapidly. The insulator has the greatest delay effect and the temperature of the bimetal drive element lags well behind the heater. Thus, when the drive element reaches the trip temperature and causes contacts 83 and 88 to open, the heater has substantially overshot the trip temperature and will continue to add heat to the bimetal drive element and cause it to overshoot the trip temperature. This increases the length of this cooling time before the bimetal drive element reaches its reset temperature and recloses contacts 83 and 88.

With 120 volts applied the heating rate of heater 50 is slower, and the heater temperature will be closer to the bimetal drive element temperature when the drive element reaches its trip temperature. Therefore the heater will cause less temperature overshoot of the drive element and, while the heating time is longer, the cooling time will be shorter and the total cycle time will be close to that with 135 volts applied.

With 105 volts applied, the heating rate is still slower and there is almost no temperature overshoot at all of the drive element and the cooling time is further reduced.

It will be seen from the graph that a 25% change in the applied voltage resulted in only a 10% change in the cycle time. Obviously the particular parameters resulting in the operational characteristics illustrated in FIG. 9 are illustrative only. The heater resistance and applied voltage determine the wattage input. The wattage input and insulative properties of the insulator determine the heating rate differential between the heater and the bimetal drive element. Superimposed on this is the operational temperature range; that is, the range between the drive element trip temperature and the drive element reset temperature. All of these factors must be brought into play and balanced in order to give optimum results. However, I have found that when the various factors are balanced so that, for the designed operational voltage, the time for the bimetal drive element to heat from the reset temperature to the trip temperature is about one third the time for the drive element to then return to its reset temperature, there will be minimum deviation in the cycle time with changes in the voltage.

What I claim as new and desire to secure by Letters Patent of the United States is:

1. A thermal motor comprising:
 (a) an elongated bimetallic drive element;
 (b) means for mounting one end of said drive element for pivotal movement; means for restraining movement of the other end of said drive element in directions transverse to its direction of elongation so that said drive element will flex intermediate its ends in one direction in response to heating and in the opposite direction in response to cooling to cause pivotal movement of said one end in opposite directions;
 (c) electrical heating means disposed in heat transfer relationship with said drive element;
 (d) a ratchet wheel;
 (e) movable pawl means for rotating said ratchet a predetermined incremental amount in one direction in response to movement of said pawl means from a first to a second position;
 (f) ambient compensating bimetal means coupling said one end of said drive element to said pawl for moving said pawl means from its first to its second position in response to a predetermined pivotal movement of said one end of said drive element in a first direction and for moving said pawl means from its second to its first position in response to predetermined pivotal movement of said one end of said drive element in a second direction;
 (g) a switch means coupled to said heating means for selectively energizing and deenergizing said heating means to control the heating and cooling of said drive element; and
 (h) means for actuating said switch means between its energizing and deenergizing positions in response to predetermined pivotal movement of said one end of said drive element.

2. The invention as set forth in claim 1 wherein a heat insulative means is positioned between said drive element and said heating means for delaying heat transfer from said heating means to said drive element and said heating means, said drive element and said heat insulative means are so interrelated that the cooling period of said drive element is approximately three times the heating period of said drive element at the designed operational voltage.

3. The invention as set forth in claim 1 wherein said switch includes an over-center actuator connected to said pawl means so as to snap between a switch open position and a switch closed position after said pawl reaches its first and second positions.

4. The invention as set forth in claim 1 wherein said means restraining said other end of said drive element includes means for selectively adjusting the position of said other end of said drive element, thereby to adjust the cycling time of said motor.

5. The invention as set forth in claim 1, further including detent means restraining rotation of said ratchet wheel as said pawl means moves from its second to its first position.

6. A thermal motor comprising:
(a) an elongated bimetallic drive element;
(b) an elongated bimetallic ambient compensating element;
(c) pivotally movable means securely engaging each of said elements adjacent corresponding ends thereof to mount said elements in generally coaxial juxtaposition in the direction of their elongation;
(d) means for restraining movement of the other end of one of said bimetallic elements in directions transverse to its direction of elongation;
(e) a ratchet wheel;
(f) movable pawl means for rotating said ratchet wheel a predetermined incremental amount in one direction in response to movement of said pawl means from a first to a second position;
(g) the other end of the other of said bimetallic elements being drivenly connected to said pawl means for moving said pawl means between its first and second positions in response to pivotal movement of said corresponding ends of said bimetallic elements;
(h) said bimetallic drive element being proportioned to flex intermediate its ends in one direction in response to heating and in the opposite direction in response to cooling to cause pivotal movement of said corresponding ends of said bimetallic elements;
(i) electrical heating means disposed in heat transfer relationship with said bimetallic drive element;
(j) switch means coupled to said heating means for selectively energizing and deenergizing said heating means to control the heating and cooling of said bimetallic drive element; and
(k) means for actuating said switch means between its energizing and deenergizing positions in response to predetermined pivotal movement of said corresponding ends of said bimetallic elements.

7. The invention as set forth in claim 6 wherein a heat insulative means is positioned between said bimetallic drive element and said heating means for delaying heat transfer from said heating means to said drive element and said heating means, said drive element and said heat insulative means are so interrelated that the cooling period of said drive element is approximately three times the heating period of said drive element at the designed operational voltage.

8. The invention as set forth in claim 6 wherein said switch includes an over-center actuator connected to said pawl means so as to snap between a switch open position and a switch closed position after said pawl reaches its first and second positions.

9. The invention as set forth in claim 6 wherein said means for restraining movement of said other end of said one bimetallic element includes means for adjusting the position of said other end of said one bimetallic element, thereby to adjust the cycling time of said motor.

10. The invention as set forth in claim 6 further including detent means restraining rotation of said ratchet wheel as said pawl means moves from its second to its first position.

References Cited

UNITED STATES PATENTS

| 952,778 | 3/1910 | Wohl et al. | 58—23 X |
| 2,004,421 | 6/1935 | Smulski | 310—4 |
| 2,189,827 | 2/1940 | Verner | 310—4 X |
| 2,588,908 | 3/1952 | Crane | 310—4 X |
| 2,722,613 | 11/1955 | Culbertson et al. | 310—4 |
| 2,729,756 | 1/1956 | Euler et al. | 310—4 |
| 2,970,454 | 2/1961 | Everard et al. | 62—154 |
| 2,978,861 | 4/1961 | Smulski | 58—23 |
| 3,113,438 | 12/1963 | Hubacker et al. | 62—155 |
| 3,202,842 | 8/1965 | Sherwood | 310—4 X |
| 3,418,499 | 12/1968 | Lester | 310—4 |

MILTON O. HIRSHFIELD, Primary Examiner

D. F. DUGGAN, Assistant Examiner

U.S. Cl. X.R.

62—155; 318—117; 337—38, 41